United States Patent
Chinni

(10) Patent No.: US 11,753,006 B2
(45) Date of Patent: Sep. 12, 2023

(54) REPRESENTING OBJECTS IN A SURROUNDING ENVIRONMENT OF A VEHICLE USING A FRENET COORDINATE SYSTEM

(71) Applicant: Robert Bosch GmbH, Stuttgart (DE)

(72) Inventor: Krishna Mohan Chinni, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 16/895,505

(22) Filed: Jun. 8, 2020

(65) Prior Publication Data

US 2021/0380106 A1 Dec. 9, 2021

(51) Int. Cl.
  *B60W 30/12* (2020.01)
  *B60W 60/00* (2020.01)
  *B60W 10/20* (2006.01)
  *G06V 20/56* (2022.01)

(52) U.S. Cl.
  CPC ............ *B60W 30/12* (2013.01); *B60W 10/20* (2013.01); *B60W 60/0027* (2020.02); *G06V 20/588* (2022.01); *B60W 2530/201* (2020.02); *B60W 2554/801* (2020.02)

(58) Field of Classification Search
  CPC .......................... B60W 30/12; B60W 60/0027
  See application file for complete search history.

(56) References Cited

U.S. PATENT DOCUMENTS 10,354,150 B2   7/2019  Yamazaki et al.
10,571,265 B2   2/2020  Jouanet et al.
11,392,128 B1*  7/2022  Ma .................... G06F 16/9027
2018/0075745 A1  3/2018  Buburuzan et al.
2018/0188059 A1  7/2018  Wheeler et al.
2018/0188372 A1  7/2018  Wheeler (Continued)

FOREIGN PATENT DOCUMENTS

CN    111998867 A   11/2020
CN    112748421 A    5/2021
WO  2020000192 A1    1/2020

OTHER PUBLICATIONS

Unknown, "Trajectory Planning in the Frenet Space: planning mobile robot trajectories in structured environments using a reference path and Frenet coordinates", <https://fjp.at/posts/optimal-frenet/>, web page publicly available at least as early as Aug. 25, 2018 (7 pages).

(Continued)

*Primary Examiner* — Jess Whittington
(74) *Attorney, Agent, or Firm* — Michael Best & Friedrich LLP

(57) ABSTRACT

A system for representing objects in a surrounding environment of a vehicle using a Frenet coordinate system. The system includes a memory and an electronic processor. The electronic processor is in communication with the memory and configured to, receive, from one or more sensors, input regarding one or more objects in the surrounding environment. The input includes, for each of the one or more objects, a representation of a location of the object in Cartesian coordinates. The electronic processor is further configured to convert the location of each object from Cartesian coordinates to Frenet coordinates and store the location of each object in Frenet coordinates in the memory.

8 Claims, 4 Drawing Sheets

(56) References Cited

U.S. PATENT DOCUMENTS

| | | | |
|---|---|---|---|
| 2018/0322777 A1 | 11/2018 | Titze et al. | |
| 2019/0155290 A1* | 5/2019 | Luo | |
| 2020/0117207 A1* | 4/2020 | Zhang | G05D 1/0221 |
| 2021/0086780 A1* | 3/2021 | Zhang | G05D 1/0088 |
| 2021/0114604 A1* | 4/2021 | Nagaraja | G06N 3/044 |
| 2021/0278225 A1* | 9/2021 | Fendler | B60W 30/16 |
| 2022/0234615 A1* | 7/2022 | Nishino | B60W 60/00 |

OTHER PUBLICATIONS

Github, "Transform Frenet (s,d) to local Cartesian (x,y) coordinates", <https://github.com/fjp/frenet>, web page publicly available before Jun. 3, 2020 (6 pages).

\* cited by examiner

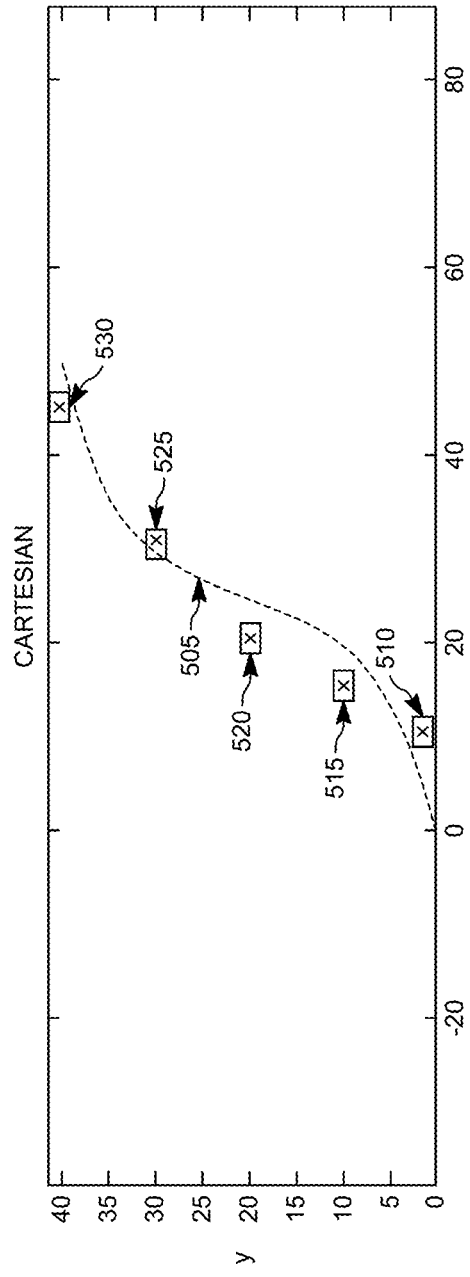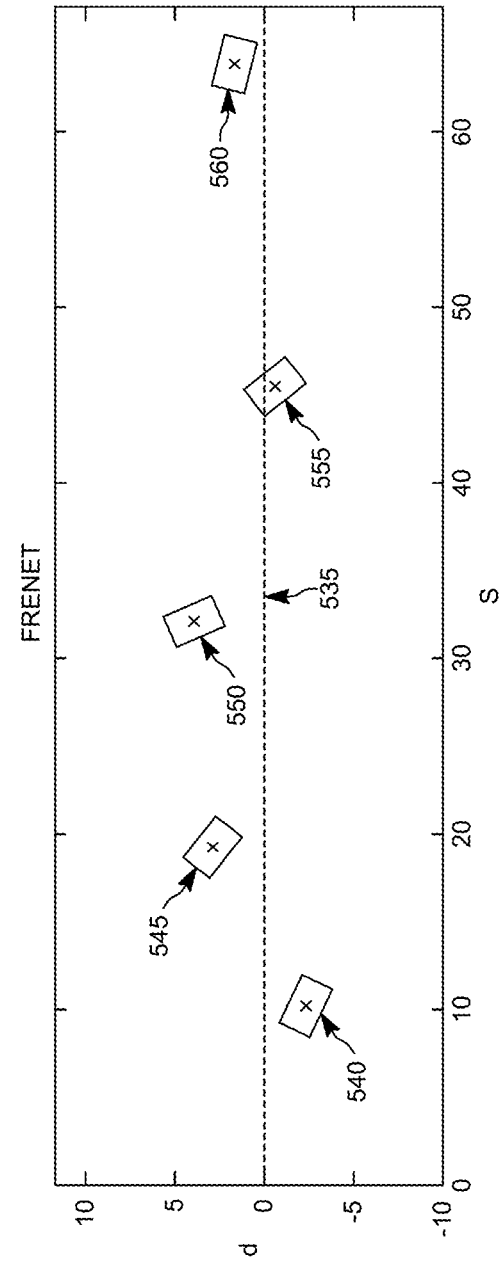

REPRESENTING OBJECTS IN A SURROUNDING ENVIRONMENT OF A VEHICLE USING A FRENET COORDINATE SYSTEM

BACKGROUND

In some vehicles, occupancy grid maps are used to map the environment of the vehicle. The occupancy grid maps may be created and stored on a memory of the vehicle, and used by the vehicle in autonomous or semi-autonomous actions.

SUMMARY

Some embodiments described herein provide a system and a method for representing objects in a surrounding environment of a vehicle using a Frenet coordinate system. Representing the environment of a vehicle with a Frenet coordinate system can reduce consumption of memory and processing resources in the creation, storing, and use of the representation of a vehicle's environment.

One embodiment provides a system for representing objects in a surrounding environment of a vehicle using a Frenet coordinate system. The system includes a memory and an electronic processor. The electronic processor is in communication with the memory and configured to, receive, from one or more sensors, input regarding one or more objects in the surrounding environment. The input includes, for each of the one or more objects, a representation of a location of the object in Cartesian coordinates. The electronic processor is further configured to convert the location of each object from Cartesian coordinates to Frenet coordinates and store the location of each object in Frenet coordinates in the memory.

Another embodiment provides a method for representing objects in a surrounding environment of a vehicle using a Frenet coordinate system. The method includes receiving, from one or more sensors, input regarding one or more objects in the surrounding environment. The input includes, for each of the one or more objects, a representation of a location of the object in Cartesian coordinates. The method further includes converting the location of each object from Cartesian coordinates to Frenet coordinates and storing the location of each object in Frenet coordinates in memory.

Other aspects will become apparent by consideration of the detailed description and accompanying drawings.

BRIEF DESCRIPTION OF THE DRAWINGS

FIG. 5A is a graphical illustration of a vehicle's environment represented in Cartesian coordinates, according to one embodiment.

FIG. 5B is a graphical illustration of a vehicle's environment represented in Frenet coordinates, according to one embodiment.

DETAILED DESCRIPTION

Figure 1:
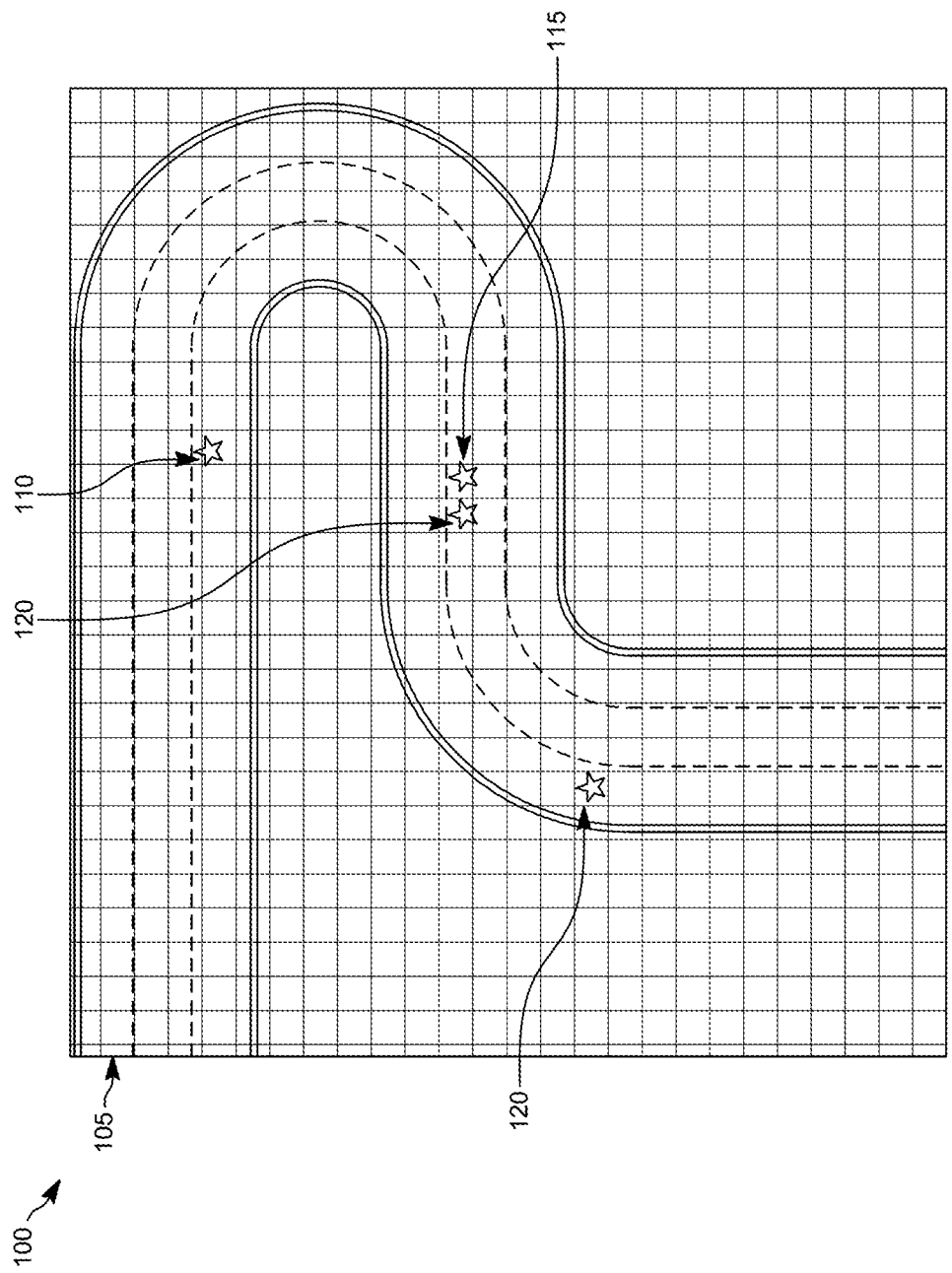
FIG. 1 is a graphical illustration of a vehicle's environment represented as a Cartesian occupancy grid map, according to one embodiment.

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways. Also, the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. As used within this document, the word "or" may mean inclusive or. As a non-limiting example, if it we stated in this document that "item Z may comprise element A or B," this may be interpreted to disclose an item Z comprising only element A, an item Z comprising only element B, as well as an item Z comprising elements A and B.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

In some vehicles, occupancy grid maps are used to map the environment of the vehicle. Occupancy grid maps may include an evenly spaced field of binary random variables. Each binary random variable represents the presence or absence of an object or obstacle at a location in the environment of the vehicle. A location for which a binary random variable represents the presence or absence of an object at may be represented by a pair of row and column numbers. In some embodiments, a binary random variable that is set to one indicates an obstacle is at the location associated with the binary random variable and a binary random variable that is set to zero indicates an obstacle is not at the location associated with the binary random vehicle.

Occupancy grid maps are often created using information received from one or more sensors included in a vehicle. The information from the one or more sensors includes the locations of detected objects in the environment of the vehicle. In some embodiments, occupancy grid maps include an evenly spaced field of vectors including binary random variables. For example, one binary random variable included in the vector may indicate the presence of an object at a location and another binary random variable represents the presence of a roadway at the location. Currently, occupancy grid maps are represented in Cartesian coordinates. Occupancy grid maps represented in Cartesian coordinates will be referred to herein as Cartesian occupancy grid maps. FIG. 1 provides a graphical example of a Cartesian occupancy grid map 100. The Cartesian occupancy grid map includes a representation of a roadway 105 and a plurality of objects. The objects in the Cartesian occupancy grid map 100 are represented as stars 110, 115, 120, 125.

Cartesian occupancy grid maps are stored in the memory of a vehicle and allow a vehicle to operate autonomously or to perform one or more autonomous or semi-autonomous actions (for example, lane changes, parking, and the like) based on the presence and location of objects in the vehicle's environment. Cartesian occupancy grid maps may be created and stored periodically (for example, once a millisecond or once a second) to, for example, ensure that a vehicle performs autonomous or semi-autonomous actions based on up-to-date information regarding objects in the vehicle's environment. Additionally, multiple Cartesian occupancy grid maps may be stored in memory to determine the velocity (speed and direction of movement) of objects in the vehicle's surrounding environment.

The creation and storage of Cartesian occupancy grid maps is one of the more resource consuming aspects of autonomous or semi-autonomous driving. For example, significant processing and memory resources are used to calculate and store a Cartesian occupancy grid map periodically (for example, once every millisecond or second), as described above.

Accordingly, some embodiments described herein provide a system and a method for representing objects in a surrounding environment of a vehicle using a Frenet coordinate system. Creating and storing a representation of the environment of the vehicle in Frenet coordinates (a Frenet occupancy grid map) takes much less memory than creating and storing a Cartesian occupancy grid map. Additionally, representing an environment of a vehicle in Frenet coordinate system eliminates the need for complex calculations to determine whether an object is in the same lane as the vehicle or the path of the vehicle, for example, because the s-coordinate of an object represents the object's distance to a center of a road that the vehicle is traveling on or the object's distance to a planned path of the vehicle.

Figure 2:
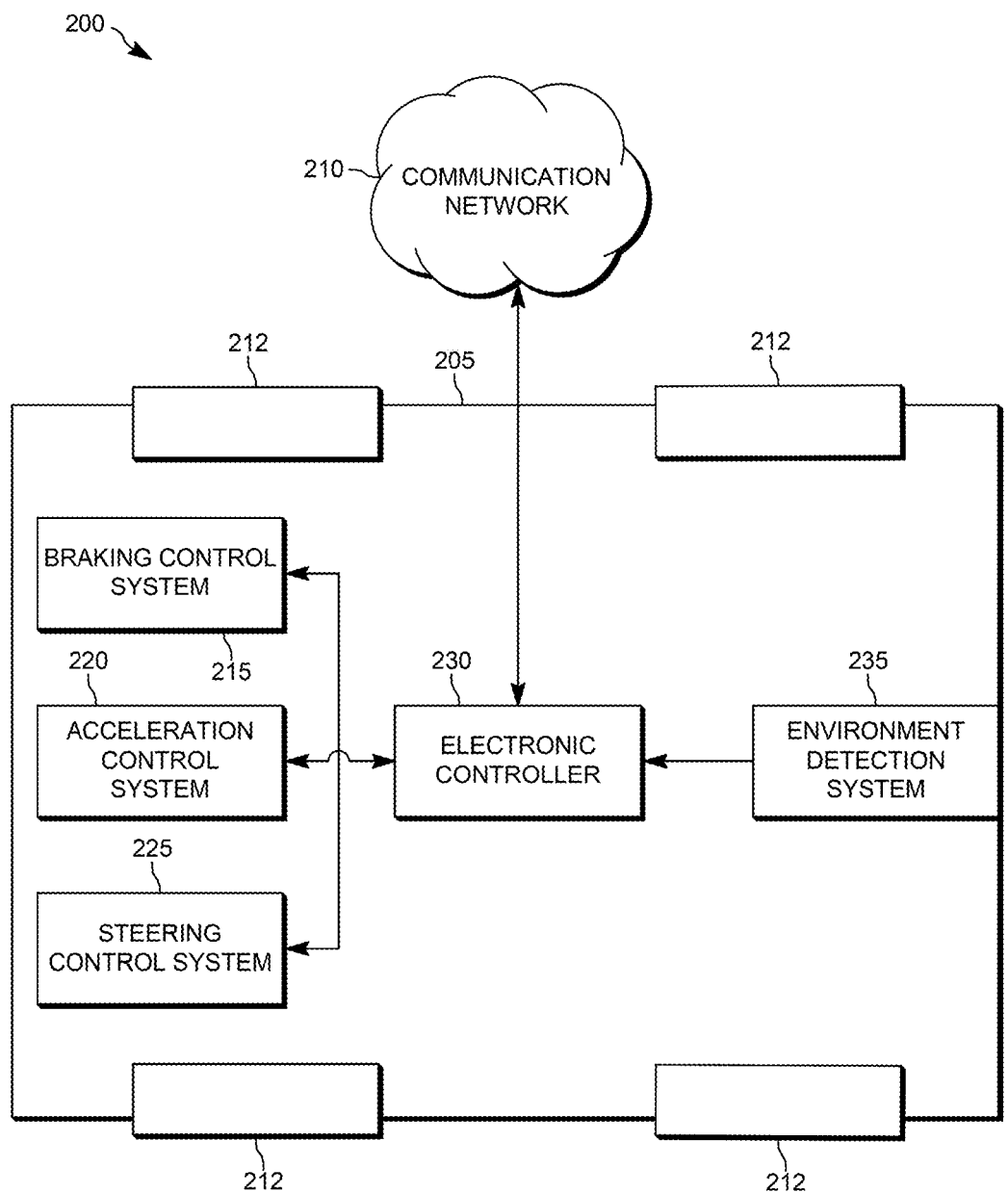
FIG. 2 is a block diagram of a system for representing objects in a surrounding environment of a vehicle using a Frenet coordinate system, according to one embodiment.

FIG. 2 illustrates a system 200 for representing objects in a surrounding environment of a vehicle using a Frenet coordinate system. The system 200 includes a vehicle 205. The vehicle 205 may communicate with one or more remote servers via a wireless communication network 210. Portions of the wireless communication network 210 may be implemented using a wide area network, such as the Internet, a local area network, such as a Wi-Fi network, short-range wireless networks, such as a Bluetooth™ network, near field communication connections, and combinations or derivatives thereof.

The vehicle 205, although illustrated as a four-wheeled vehicle (see wheels 212), may encompass various types and designs of vehicles. For example, the vehicle 205 may be an automobile, a motorcycle, a truck, a bus, a semi-tractor, and others. The vehicle 205 includes at least some autonomous functionality, but may also require a driver or operator to perform driving functions. In the example illustrated, the vehicle 205 includes several hardware components including a braking control system 215, an acceleration control system 220, a steering control system 225, an electronic controller 230, and an environment detection system 235. The components of the system 200 may be of various constructions and may use various communication types and protocols.

The electronic controller 230 may be communicatively connected to the braking control system 215, acceleration control system 220, steering control system 225, and environment detection system 235 via various wired or wireless connections. For example, in some embodiments, the electronic controller 230 is directly coupled via a dedicated wired link to each of the above-listed components of the system 200. In other embodiments, the electronic controller 230 is communicatively coupled to one or more of the components via a shared communication link such as a vehicle communication bus (for example, a controller area network (CAN) bus) or a wireless vehicle network. The environment detection system 235 may include, for example, a lidar sensor, a radar sensor, an ultrasonic sensor, a camera, a combination of the foregoing, or the like. The sensors may be, for example, directed outward in various directions from the vehicle (e.g., frontward, rearward, to the left, to the right, and the like) and configured to detect objects and other environmental characteristics. Using, for example, the lidar and radar sensor may be configured to transmit a signal, receive a reflection of the signal off of an object, and, based on one or more of the time-of-flight between transmission and reflection, the direction of transmission and reception, and the current heading of the vehicle 205, determine the location of the object with respect to the vehicle 205. Similarly, image data produced by the camera may be processed by the environment detection system 235 or the electronic controller 230 to detect objects, roadways, lanes, and the like.

Each of the components of the system 200 may communicate with the electronic controller 230 using various communication protocols. The embodiment illustrated in FIG. 2 provides but one example of the components and connections of the system 200. However, these components and connections may be constructed in other ways than those illustrated and described herein.

Figure 3:
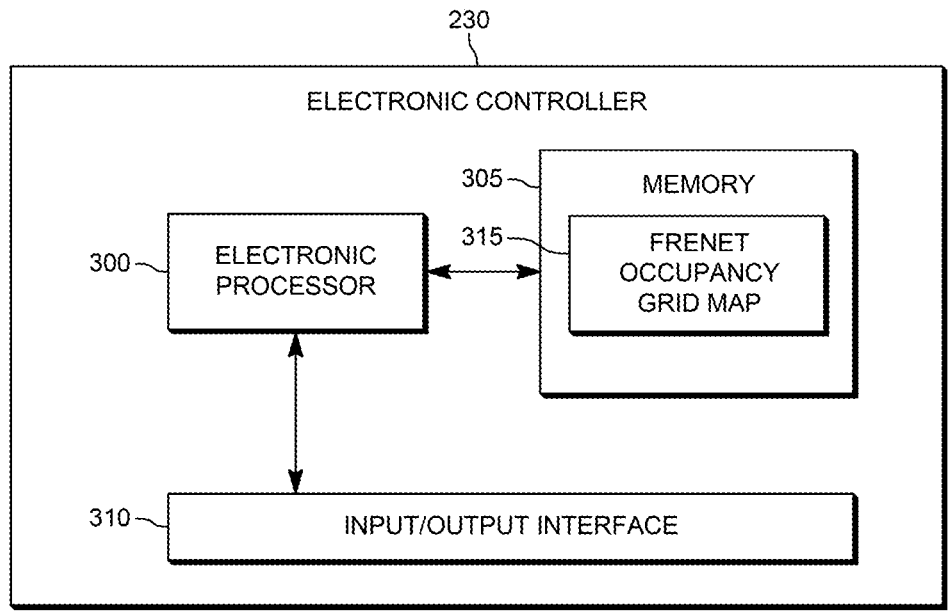
FIG. 3 is a block diagram of an electronic controller of the system of FIG. 2, according to one embodiment.

FIG. 3 is a block diagram of the electronic controller 230 of the system of FIG. 2. The electronic controller 230 includes a plurality of electrical and electronic components that provide power, operation control, and protection to the components and modules within the electronic controller 230. In the example illustrated, the electronic controller 230 includes, among other things, an electronic processor 300 (such as a programmable electronic microprocessor, microcontroller, or similar device), a memory 305 (for example, non-transitory, machine readable memory), and an input/output interface 310. The electronic processor 300 is communicatively connected to the memory 305 and the input/output interface 310. The electronic processor 300, in coordination with the memory 305 and the input/output interface 310, is configured to implement, among other things, the methods described herein. Although the electronic processor 300, the memory 305, and the input/output interface 310 are each illustrated as singular units, in some embodiments, one or more of the electronic processor 300, the memory 305, and the input/output interface 310 are made up of multiple such elements. For example, the electronic processor 300 may include multiple processors, and the memory may include multiple memories, and the input/output interface 310 may include multiple interface elements. Additionally, in some embodiments, one or more of the electronic processor 300, the memory 305, and the input/output interface 310 are distributed elements and implemented, at least in part, remotely from the vehicle 205, and such remote elements are communicatively coupled to the vehicle 205 (e.g., via the communication network 210). In some embodiments, the memory 305 includes a Frenet occupancy grid map 315 representing the location of objects in the vehicle's environment.

Figure 4:
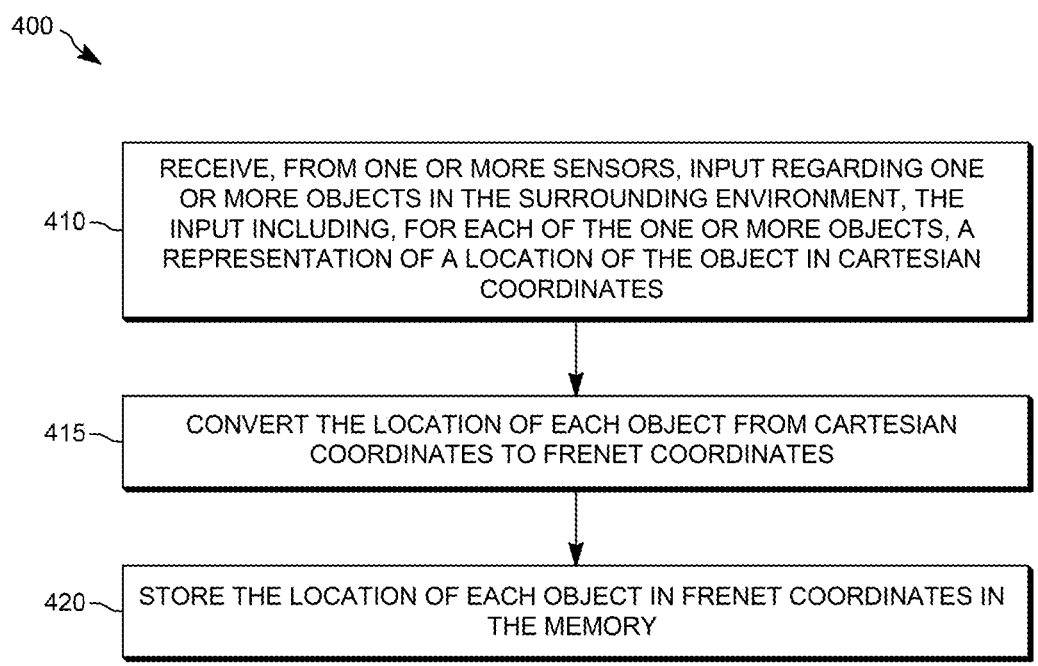
FIG. 4 is a flowchart of a method for representing objects in a surrounding environment of a vehicle using a Frenet coordinate system, according to one embodiment.

FIG. 4 illustrates an example flowchart of a method 400 for representing objects in a surrounding environment of a vehicle using a Frenet coordinate system. In some embodiments, before the method 400 begins, the electronic processor 300 accesses a representation of a road on which the vehicle is traveling. In some embodiments, the representation of the road that the electronic processor 300 accesses includes a centerline of the road. In some embodiments, the centerline of the road is the centerline of the entire road. For example, if a road includes four lanes, the centerline is the third lane marking from the right of the road and the third lane marking from the left of the road. In some embodiments, the centerline of the road is the centerline of the lane on which the vehicle is currently traveling. The electronic processor 300 may receive the representation of the road from a remote server via the communication network 210. For example, the vehicle 205 may include a graphical positioning system (GPS) via which the electronic processor 300 may determine the location of the vehicle 205. The electronic processor 300 may send to a remote server the current location of the vehicle 205 along with a request for a representation of a road at the location of the vehicle 205. In some embodiments, the request indicates the portion of the road that should be included in the representation. For example, the request may specify that the representation should include a representation of the road for the next 500 feet or 1000 feet in the northward direction, southward direction, eastward direction, west direction, a combination of the foregoing, or the like. The remote server may, in turn, request a representation of a road at the location of the vehicle 205 from a database with which the remote server is in communication. Upon receiving the representation of the road from the database, the remote server will return the representation of the road to the electronic processor 300 in response to the request from the electronic processor 300.

In some embodiments, the electronic processor 300 may create a representation of a road the vehicle is traveling on using input from the environment detection system 235. For example, a camera included in the environment detection system 235 may provide information regarding the width of the road and the number of lanes in the road to the electronic processor 300 allowing the electronic processor 300 to create a representation of the road including the centerline of the road.

The method 400 begins at step 410, when the electronic processor 300 receives, from one or more sensors, input regarding one or more objects in the surrounding environment, the input including, for each of the one or more objects, a representation of a location of the object in Cartesian coordinates. The one or more sensors may be a part of the environment detection system 235 and include a camera, radar sensor, lidar sensor, ultrasonic sensor, a combination of the foregoing, and the like. In some embodiments, also included in the Cartesian coordinate representation of objects in the environment of the vehicle 205, is a line representing the centerline of the road on which the vehicle 205 is traveling. In some embodiments, the electronic processor 300 does not receive, create, or access a representation of a road the vehicle 205 is traveling on. In these embodiments, the Cartesian coordinate representation of objects in the environment of the vehicle 205 includes a line representing a planned path of the vehicle 205. In some embodiments, the planned path is the predicted or expected route the vehicle will move along in the future. In some embodiments, the planned path of the vehicle 205 is generated by one or more autonomous or semi-autonomous driving programs or functions executed by the electronic processor 300 and stored in the memory 305. In some embodiments, the planned path is determined by the electronic processor 300 based on a direction the vehicle is traveling, an activation of a turn signal, a route received from a route planning application, a combination of the foregoing, or the like. FIG. 5A is an example representation of objects in a vehicle's environment in Cartesian coordinates. In FIG. 5A, the line 505 represents the centerline of the road on which the vehicle is traveling or a planned path of the vehicle 205 and the blocks 510, 515, 520, 525, 530 represent objects in the environment of the vehicle 205. The origin point (0,0) of the Cartesian coordinate representation of objects in the environment of the vehicle 205 is, for the x-coordinate and the y-coordinate, the location of the vehicle 205.

At step 415, the electronic processor 300 converts the location of each object from Cartesian coordinates to Frenet coordinates. In Frenet coordinates, the s-axis represents a distance along a road from the vehicle 205 (a longitudinal distance) and the d-axis represents a lateral distance from a centerline of a road or a planned path of the vehicle 205. The origin point (0,0) of the Frenet coordinate representation of objects in the environment of the vehicle 205 is, for the s-coordinate and the d-coordinate, the location of the vehicle 205. FIG. 5B is an example representation of objects in a vehicle's environment in Frenet coordinates. In FIG. 5B, the line 535 represents the centerline of the road that the vehicle 205 is traveling on or the planned path of the vehicle 205 and the blocks 540, 545, 550, 555, 560 represent objects in the environment of the vehicle 205. In FIG. 5B, the line 535 represents the same centerline of the road or planned path represented by line 505 of FIG. 5A, block 540 represents the same object as block 510 included in FIG. 5A, block 545 represents the same object as block 515 included in FIG. 5A, block 550 represents the same object as block 520 included in FIG. 5A, block 555 represents the same object as block 525 included in FIG. 5A, block 560 represents the same object as block 530 included in FIG. 5A. As illustrated, when a block included in a Frenet coordinate representation of objects in the environment of the vehicle 205 is associated with a negative d-axis value, the object is located to the right of the centerline of the road or the planned path. When a block included in a Frenet coordinate representation of objects in the environment of the vehicle 205 is associated with a positive d-axis value is located to the left of the centerline of the road or the planned path. In some embodiments, the meaning of the positive and negative d-axis values is flipped (e.g., positive d-axis value is located to the right of the centerline of the road or the planned path).

In some embodiments, to convert a Cartesian coordinates of an object to Frenet coordinates, the electronic processor 300 executes a conversion algorithm using the Cartesian coordinates of an object and using the line 505, which may itself be represented by a series of points each having their own Cartesian coordinates. For example, given that block 510 is located at point $P_C$ in Cartesian coordinates, the electronic processor 300 searches for a point $R_C$ on the line 505 closest to the point $P_C$. The distance from the origin (0,0) point in Cartesian coordinates to $R_C$ via the line 505 determines the s-coordinate of the block 540 in Frenet coordinates. The signed length of vector between points $R_C$ and $P_C$ determines the d-coordinate of the block 540 in Frenet coordinates.

At block 420, the electronic processor 300 stores the location of each object in Frenet coordinates in the memory 305. The location of each object in Frenet coordinates stored in the memory 305 may be referred to herein as a Frenet occupancy grid map. In some embodiments, the electronic processor 300 utilizes the stored Frenet occupancy grid map to control autonomous or semi-autonomous movement or motion of the vehicle 205. For example, the electronic processor 300 may use at least one selected from the group of the braking control system 215, acceleration control system 220, and steering control system based 225 based on at least one of the locations of objects stored in Frenet coordinates in the memory 305. In one example scenario, the electronic processor 300 may determine a lane of the road that the vehicle 205 is traveling in and determine, based on the s-coordinates of objects in Frenet coordinates stored in the memory 305 (in this case, the lateral distance between the centerline of the road and the object), that an object is in the same lane as the vehicle 205. Based on the fact that the object is included in the same lane as the vehicle 205, the electronic processor 300 may use the braking control system 215, acceleration control system 220, and steering control system 225, or a combination of the foregoing to slow the vehicle 205, stop the vehicle 205, maneuver the vehicle 205 around the object, or the like. In another example, the electronic processor 300 determines based on the s-coordinates of objects in Frenet coordinates stored in the memory 305 (in this case, the lateral distance between the planned path and the object), whether an object will obstruct the vehicle 205 as the vehicle 205 moves along the planned path. For example, if the electronic processor 300 determines, based on, for example, a value included in the memory 305, a width of the vehicle 205 to be, for example, 8 feet, the electronic processor 300 determines an object to be located in the path of the vehicle if the object is located 4 feet or less to the left of the planned path of the vehicle 205 or 4 feet or less to the right of the planned path of the vehicle 205. When an object is in the path of the vehicle 205, the electronic processor 300 may use the braking control system 215, acceleration control system 220, and steering control system 225, or a combination of the foregoing to slow the vehicle 205, stop the vehicle 205, maneuver the vehicle 205 around the object, or the like.

The method 400 may be performed by the electronic processor 300 periodically (for example, every millisecond, every second, every five seconds, or the like). In some embodiments, the memory 305 may store the Frenet occupancy grid maps created in a predetermined number of executions of the method 400. For example, the memory 305 may include the Frenet occupancy grid maps for a predetermined number of the most previous executions of the method 400. For example, the memory 305 may include the Frenet occupancy grid maps for the last five executions of the method 400. By storing the Frenet occupancy grid maps from previous executions of the method 400, the electronic processor 300 may be able to determine the speed and trajectory of objects in the surrounding environment of the vehicle 205. Predicting the speed and trajectory of objects in the surrounding environment of the vehicle 205 allows the electronic processor 300 to better control the vehicle 205. For example, when the electronic processor 300 determines that an object is currently in the same lane as the vehicle 205, but the object is moving in direction perpendicular to the vehicle, the electronic processor 300 may determine that the vehicle 205 should slow down, rather than change lanes and risk that the vehicle 205 changes to the lane into which the object is moving.

In some embodiments of the method 400, the electronic processor 300 may export one or more of the Frenet occupancy grid maps. For example, these Frenet occupancy grid maps may be transmitted by the electronic processor 300 to a remote server via the communication network 210, for later access and display by other systems.

Various features and advantages are set forth in the following claims.

The invention claimed is:

1. A system for representing objects in a surrounding environment of a vehicle using a Frenet coordinate system, the system comprising:
   a braking control system;
   an acceleration control system;
   a steering control system;
   a memory; and
   an electronic processor in communication with the memory and configured to,
      receive, from one or more sensors, input regarding one or more objects in the surrounding environment, the input including, for each of the one or more objects, a representation of a location of the object in Cartesian coordinates;
      access a representation of a road on which the vehicle is traveling, the representation including a lane marking between lanes of the road;
      convert the location of each object from Cartesian coordinates to Frenet coordinates;
      store the location of each object in Frenet coordinates in the memory;
      determine a lane that the vehicle is traveling in; and
      for each object in the surrounding environment,
         determine a longitudinal distance between the vehicle and the object and a lateral distance between the lane marking between lanes of the road and the object using the Frenet coordinates stored in the memory that represent the location of the object;
         determine whether the object is in the same lane as the vehicle based on the lateral distance between the lane marking between lanes of the road and the object being positive or negative; and
         control motion of the vehicle using at least one selected from the group consisting of the braking control system, acceleration control system, and steering control system based on whether the object is in the same lane as the vehicle.

2. The system according to claim 1, wherein the one or more sensors include at least one selected from the group consisting of a camera, an ultrasonic sensor, a radar sensor, and a lidar sensor.

3. The system according to claim 1, wherein the system includes a remote server and the electronic processor is further configured to
   send, to the remote server, a request for the representation of the road on which the vehicle is traveling, the request including the location of the vehicle and a portion of the road, and
   in response to the request, receive, from the remote server, the representation of the road on which the vehicle is traveling.

4. The system according to claim 1, wherein the electronic processor is further configured to
   determine a planned path of the vehicle;

for each object in the surrounding environment, determine a longitudinal distance between the vehicle and the object and a lateral distance between the planned path and the object using the Frenet coordinates stored in the memory that represent the location of the object; and for each object in the surrounding environment, determine whether the object will obstruct the vehicle as the vehicle moves along the planned path based on a width of the vehicle and the lateral distance between the planned path and the object.

5. A method for representing objects in a surrounding environment of a vehicle using a Frenet coordinate system, the method comprising:

receiving, from one or more sensors, input regarding one or more objects in the surrounding environment, the input including, for each of the one or more objects, a representation of a location of the object in Cartesian coordinates;

accessing, with an electronic processor, a representation of a road on which the vehicle is traveling, the representation including a lane marking between lanes of the road;

converting the location of each object from Cartesian coordinates to Frenet coordinates;

storing the location of each object in Frenet coordinates in memory;

determining a lane that the vehicle is traveling in; and for each object in the surrounding environment,
  determining a longitudinal distance between the vehicle and the object and a lateral distance between the lane marking between lanes of the road and the object using the Frenet coordinates stored in the memory that represent the location of the object;
  determining whether the object is in the same lane as the vehicle based on the lateral distance between the lane marking between lanes of the road and the object being positive or negative; and
  controlling motion of the vehicle using at least one selected from the group consisting of a braking control system, an acceleration control system, and a steering control system based on based on whether the object is in the same lane as the vehicle.

6. The method according to claim 5, wherein the one or more sensors include at least one selected from the group consisting of a camera, an ultrasonic sensor, a radar sensor, and a lidar sensor.

7. The method according to claim 5, the method further comprising
sending, to a remote server, a request for the representation of the road on which the vehicle is traveling, the request including the location of the vehicle and a portion of the road, and
in response to the request, receiving, from the remote server, the representation of the road on which the vehicle is traveling.

8. The method according to claim 5, the method further comprising
determining a planned path of the vehicle;
for each object in the surrounding environment, determining a longitudinal distance between the vehicle and the object and a lateral distance between the planned path and the object using the Frenet coordinates stored in the memory that represent the location of the object; and
for each object in the surrounding environment, determining whether the object will obstruct the vehicle as the vehicle moves along the planned path based on a width of the vehicle and the lateral distance between the planned path and the object.

\* \* \* \* \*